(12) United States Patent
Lin et al.

(10) Patent No.: US 10,596,565 B2
(45) Date of Patent: Mar. 24, 2020

(54) METHOD OF MANUFACTURING MICROFLUIDIC CHIP AND A MICROFLUIDIC CHIP MADE THEREBY

(71) Applicant: Taiwan Green Point Enterprises Co., Ltd., Taichung (TW)

(72) Inventors: Yi-Cheng Lin, Taichung (TW); Sung-Yi Yang, Taichung (TW)

(73) Assignee: Taiwan Green Point Enterprises Co., Ltd., Taichung (TW)

( * ) Notice: Subject to any disclaimer, the term of this patent is extended or adjusted under 35 U.S.C. 154(b) by 332 days.

(21) Appl. No.: 15/670,645

(22) Filed: Aug. 7, 2017

(65) Prior Publication Data
US 2018/0043359 A1 Feb. 15, 2018

(30) Foreign Application Priority Data
Aug. 9, 2016 (TW) .............................. 105125242 A (51) Int. Cl.
*B01L 3/00* (2006.01)
*F16K 99/00* (2006.01)

(52) U.S. Cl.
CPC ........ *B01L 3/502707* (2013.01); *F16K 99/00* (2013.01); *F16K 99/0026* (2013.01); *F16K 99/0059* (2013.01); *B01L 2300/0816* (2013.01); *B01L 2300/0864* (2013.01); *B01L 2300/0867* (2013.01); *B01L 2300/123* (2013.01); *B01L 2400/0481* (2013.01); *B01L 2400/0655* (2013.01); *F16K 2099/008* (2013.01); *F16K 2099/0074* (2013.01)

(58) Field of Classification Search
CPC ....... B01L 3/502707; B01L 2400/0481; B01L 2300/0867; B01L 2300/0816; B01L 2400/0655; B01L 2300/0864; B01L 2300/123; F16K 99/0059; F16K 99/0026; F16K 99/00; F16K 2099/0074; F16K 2099/008
See application file for complete search history.

(56) References Cited

U.S. PATENT DOCUMENTS

| 2002/0144738 A1* | 10/2002 | Unger | B01L 3/502707 137/824 |
| 2005/0062196 A1* | 3/2005 | Hansen | B01F 5/10 264/219 |
| 2005/0230767 A1* | 10/2005 | Park | B01L 3/502707 257/414 |

(Continued)

*Primary Examiner* — Samuel P Siefke
(74) *Attorney, Agent, or Firm* — Young Basile Hanlon & MacFarlane, P.C.

(57) ABSTRACT

A method of manufacturing a microfluidic chip includes providing an upper mold having multiple upper ribs extending along a second direction, and a lower mold having multiple lower ribs extending along a first direction different from the second direction, forming a forming material in a filling space defined by the upper and lower molds to provide a channeled plate having multiple upper microfluidic channels complementary in shape to the upper ribs, lower microfluidic channels complementary in shape to the lower ribs, and multiple thin film valves formed at intersections where the upper microfluidic channels intersect the lower microfluidic channels, separating the upper and lower molds, and covering the lower and upper microfluidic channels.

14 Claims, 12 Drawing Sheets

(56) References Cited

U.S. PATENT DOCUMENTS

| | | | |
|---|---|---|---|
| 2009/0115094 A1* | 5/2009 | Chou | B01L 3/502707 |
| | | | 264/219 |
| 2009/0257920 A1* | 10/2009 | Facer | B01F 5/02 |
| | | | 422/400 |
| 2011/0126911 A1* | 6/2011 | Kobrin | B01F 11/0071 |
| | | | 137/1 |
| 2019/0283284 A1* | 9/2019 | Nishigaki | B29C 35/0894 |

* cited by examiner

METHOD OF MANUFACTURING MICROFLUIDIC CHIP AND A MICROFLUIDIC CHIP MADE THEREBY

CROSS REFERENCE TO RELATED APPLICATION

This application claims the benefit of Taiwanese Patent Application No. 105125242, filed on Aug. 9, 2016, which is incorporated by reference as if fully set forth.

FIELD OF INVENTION

The disclosure relates to a method of manufacturing a microfluidic chip and a microfluidic chip made thereby.

BACKGROUND

Figure 1:
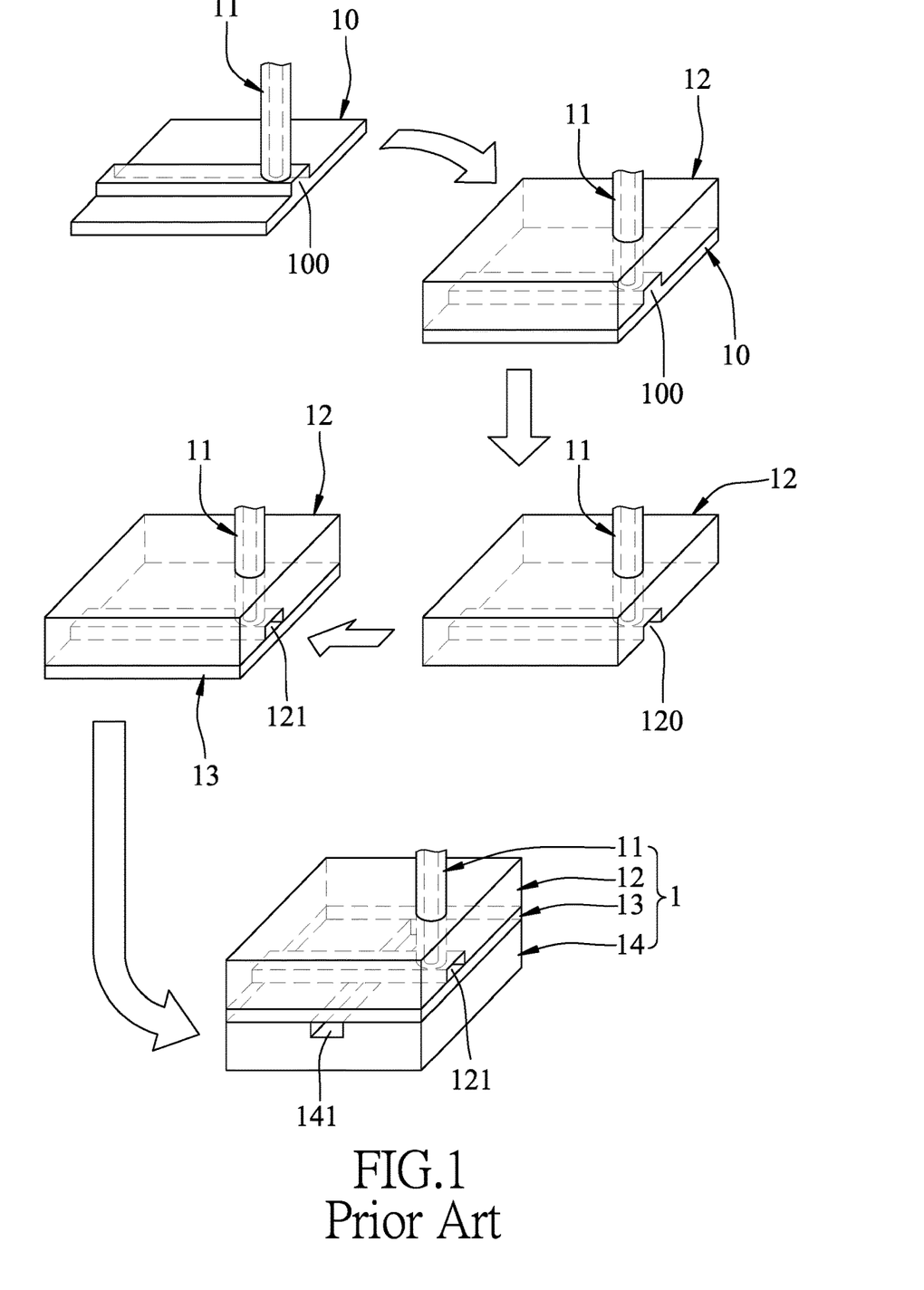
FIG. 1 shows a manufacturing method of a microfluidic device.
Figure 2:
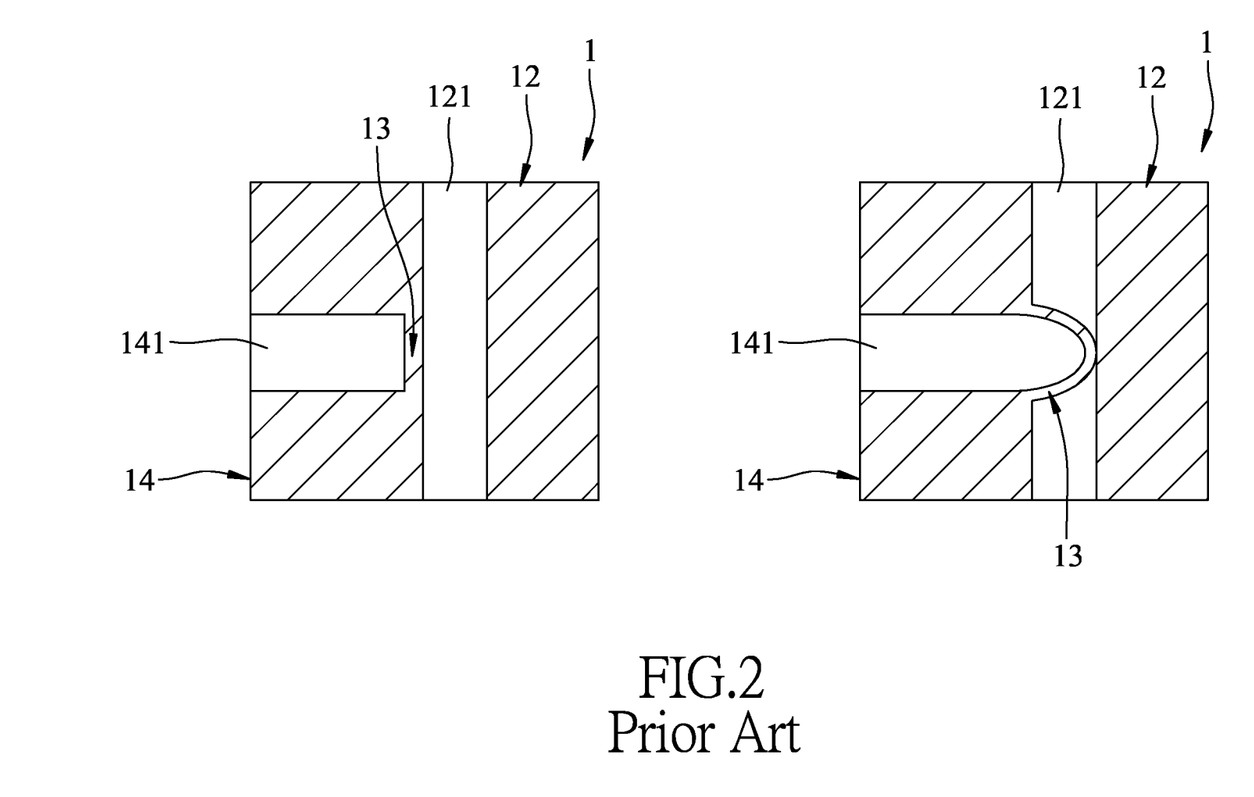
FIG. 2 shows operation of the microfluidic device.

Referring to FIGS. 1 and 2, U.S. Pat. No. 6,951,632 B2 discloses a microfluidic device 1 and a manufacturing method thereof.

The microfluidic device 1 is made by a conventional multilayer soft lithography (MSL) process. Specifically, the manufacturing method of the microfluidic device 1 includes: placing a capillary element 11 in contact with and perpendicular to a protrusion 100 of a mold 10; coating an elastomeric polymer precursor 12 on the mold 10 and surrounding the capillary element 11; removing the mold 10 from the elastomeric polymer precursor 12, such that the elastomeric polymer precursor 12 is formed with a micro-trench 120 that is complementary in shape to the protrusion 100 of the mold 10 and that is in spatial communication with the capillary element 11; attaching an elastic thin membrane layer 13 to the elastomeric polymer precursor 12 to cover the micro-trench 120, such that a microfluidic channel 121 is formed; and attaching a control channel layer 14 to the elastic thin membrane layer 13, the control channel layer 14 having a control channel 141 that faces the elastic thin membrane layer 13 and that is transverse to the microfluidic channel 121.

The capillary element 11 is used for injecting fluid into the microfluidic channel 121 or dispensing fluid from the microfluidic channel 121. When the microfluidic device 1 is in operation, a pressurized gas is introduced into the control channel 141 to deform the elastic thin membrane layer 13 to close the microfluidic channel 121, thereby cutting off fluid passage in the microfluidic channel 121 (see right side of FIG. 2). When the pressurized gas is discharged from the control channel 141, the elastic thin membrane layer 13 is returned to its undeformed state, allowing fluid passage in the microfluidic channel 121 (see left side of FIG. 2).

The MSL process suffers a misalignment issue while attempting to attach the control channel layer 14 onto the elastic thin membrane layer 13, in which the control channel 141 may not be precisely positioned to intersect with the microfluidic channel 121, thereby causing the microfluidic channel 121 to be inaccurately closed.

SUMMARY

Therefore, an object of the present disclosure is to provide a method of manufacturing a microfluidic chip and a microfluidic chip made thereby that can alleviate the drawback associated with the prior art.

According to a first aspect of the present disclosure, a method of manufacturing a microfluidic chip includes:

providing a metal mold assembly which includes an upper mold and a lower mold, the upper mold having an array of upper ribs extending toward the lower mold and an array of upper trenches, each of the upper trenches being defined by two adjacent ones of the upper ribs, the lower mold having an array of lower ribs extending toward the upper mold and an array of lower trenches, each of the lower trenches being defined by two adjacent ones of the lower ribs, the upper ribs being spaced apart along a first direction and extending along a second direction different from the first direction, the lower ribs being spaced apart along the second direction, extending along the first direction and intersecting the upper ribs at a plurality of intersections, a lower end of the upper ribs and an upper end of the lower ribs cooperatively defining a plurality of gaps that are respectively located at the intersections, the upper trenches, the lower trenches and the gaps being spatially interconnected and cooperatively defining a filling space;

forming a forming material in the filling space to provide a channeled plate having an array of upper microfluidic channels that is complementary in shape to the array of the upper ribs of the upper mold, an array of lower microfluidic channels that is complementary in shape to the array of the lower ribs of the lower mold, and an array of thin film valves, the thin film valves being complementary in shape to the gaps;

separating the upper and lower molds from the channeled plate; and covering the array of the lower microfluidic channels and the array of the upper microfluidic channels.

According to a second aspect of the present disclosure, a microfluidic chip includes a carrier plate, a channeled plate disposed on the carrier plate, and an upper cover.

The channeled plate has an upper surface, a lower surface opposite to the upper surface, a gaseous fluid channel unit, a liquid fluid channel unit, and an array of thin film valves. The gaseous fluid channel unit has an array of upper microfluidic channels indented from the upper surface. The upper microfluidic channels are intercommunicated, spaced apart along a first direction, and extend along a second direction different from the first direction. The liquid fluid channel unit has an array of lower microfluidic channels indented from the lower surface and discommunicated from the upper microfluidic channels. The lower microfluidic channels are intercommunicated, spaced apart along the second direction, extend along the first direction, and intersect the upper microfluidic channels at a plurality of intersections. The array of the thin film valves are formed at the intersections.

The upper cover is attached to the upper surface and seals the upper microfluidic channels.

According to a third aspect of the present disclosure, a method of manufacturing a microfluidic chip includes:

providing a lower mold that includes at least one lower rib extending in a first direction;

providing an upper mold that includes at least two adjacent and spaced apart upper ribs extending in a second direction different from the first direction;

closing the upper and lower molds, the upper ribs intersecting the lower rib at at least one intersection, a gap being formed at the intersection;

forming a channeled plate between the upper and lower molds after the upper and lower molds are closed, the channeled plate having at least one upper microfluidic channel that is complementary in shape to the upper ribs, at least one lower microfluidic channel that is complementary in shape to the lower rib, and at least one thin film valve that is complementary in shape to the gap;

separating the upper and lower molds; and covering the upper and lower microfluidic channels.

According to a fourth aspect of the present disclosure, a method of manufacturing a microfluidic chip includes:

providing a forming material;

hot press molding a first surface of the forming material to form at least one first microfluidic channel;

hot press molding a second surface of the forming material opposite to the first surface to form at least one second microfluidic channel, a thin film valve being formed at an intersection where the first microfluidic channel intersects the second microfluidic channel, the thin film valve being elastically deformed to close the second microfluidic channel when a pressurized gas is introduced into the first microfluidic channel; and covering the first and second microfluidic channels.

According to a fifth aspect of the present disclosure, a method of manufacturing a microfluidic chip includes:

placing a forming material into a filling space of a mold assembly;

forming a first surface of the forming material into at least one first microfluidic channel within the filling space;

forming a second surface of the forming material into at least one second microfluidic channel within the filling space, the second surface being opposite to the first surface, a thin film valve being formed at an intersection where the first microfluidic channel intersects the second microfluidic channel, the thin film valve being elastically deformed to close the second microfluidic channel when a pressurized gas is introduced into the first microfluidic channel, whereby the forming material is formed into a channeled plate;

removing the channeled plate from the filling space; and covering the first and second microfluidic channels.

BRIEF DESCRIPTION OF THE DRAWING(S)

Other features and advantages of the disclosure will become apparent in the following detailed description of the exemplary embodiments with reference to the accompanying drawings, of which.

DETAILED DESCRIPTION OF THE PREFERRED EMBODIMENT(S)

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
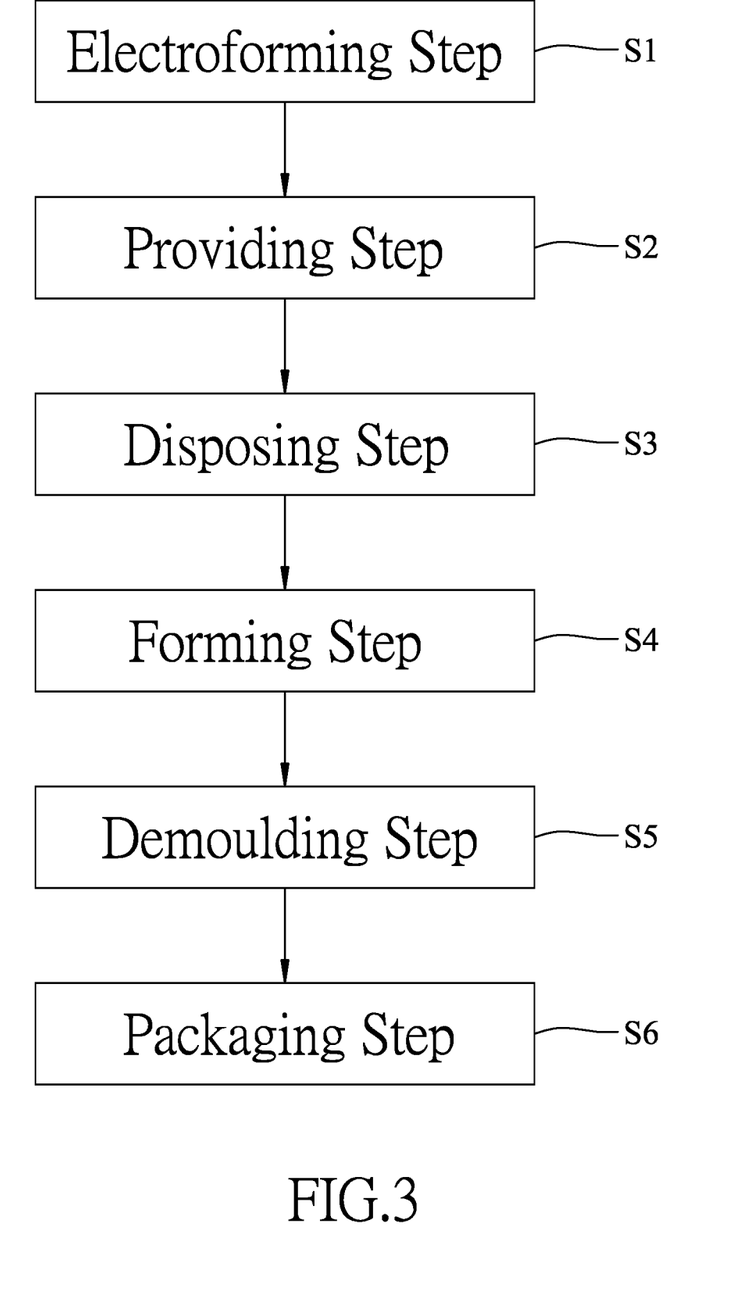
FIG. 3 is a flow chart of a first embodiment of a method of manufacturing a microfluidic chip according to the present disclosure.

Referring to FIG. 3, a first embodiment of a method of manufacturing a microfluidic chip according to the present disclosure includes an electroforming step (S1), a providing step (S2), a disposing step (S3), a forming step (S4), a demoulding step (S5), and a packaging step (S6).

It is noted that the electroforming step (S1) will be described in detail hereinafter.

Figure 4:
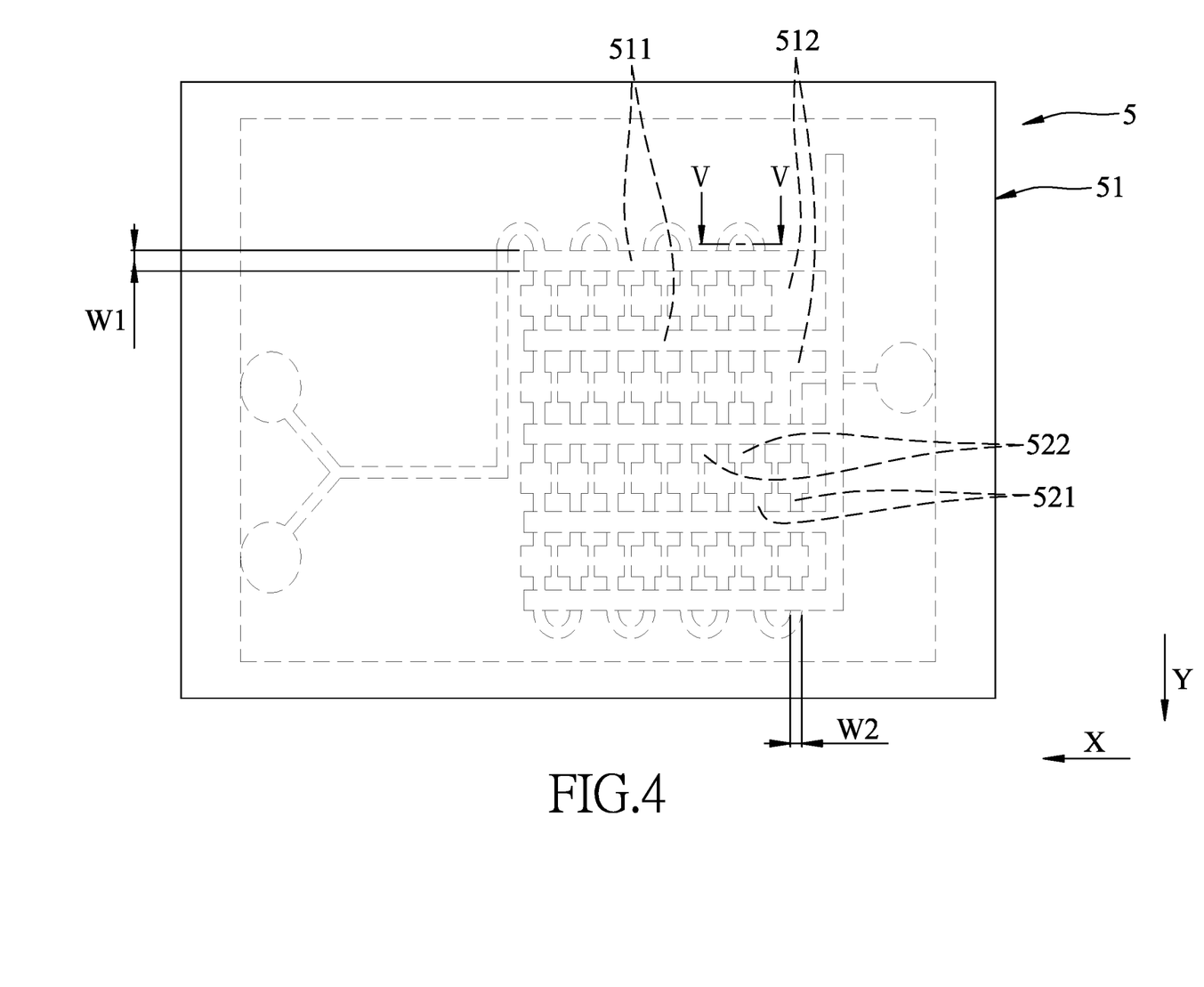
FIG. 4 is a schematic view of a metal mold assembly used in the first embodiment.
Figure 5:
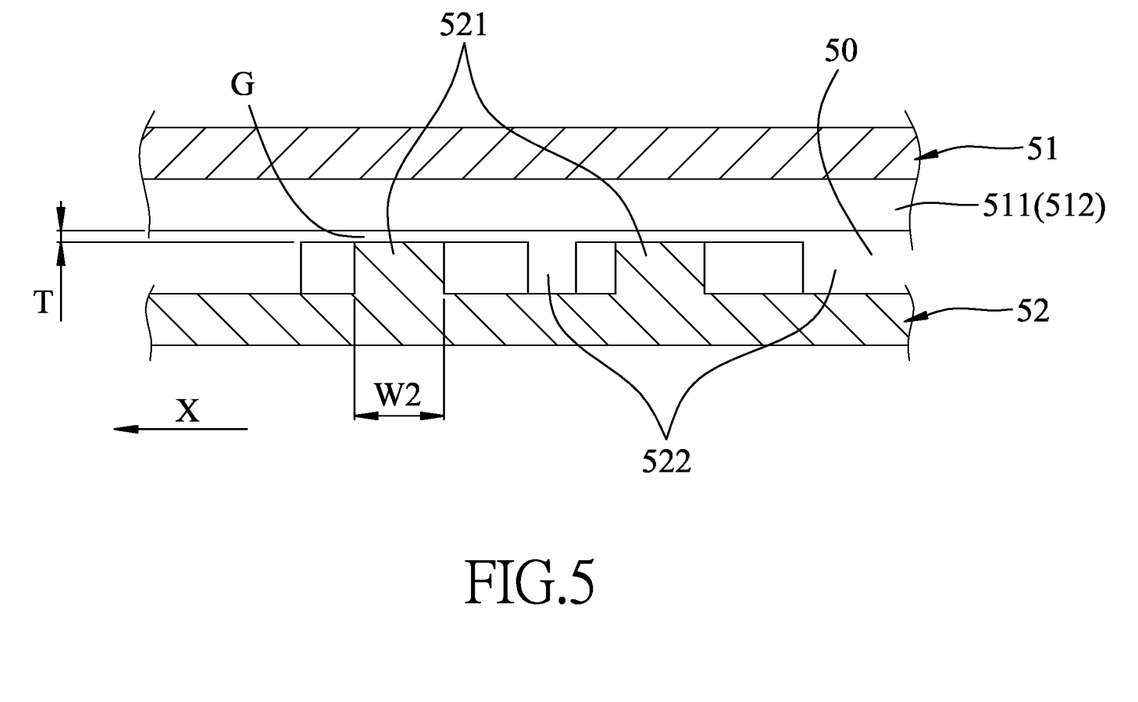
FIG. 5 is a fragmentary cross-sectional view of the metal mold assembly taken along line V-V of FIG. 4.
Figure 6:
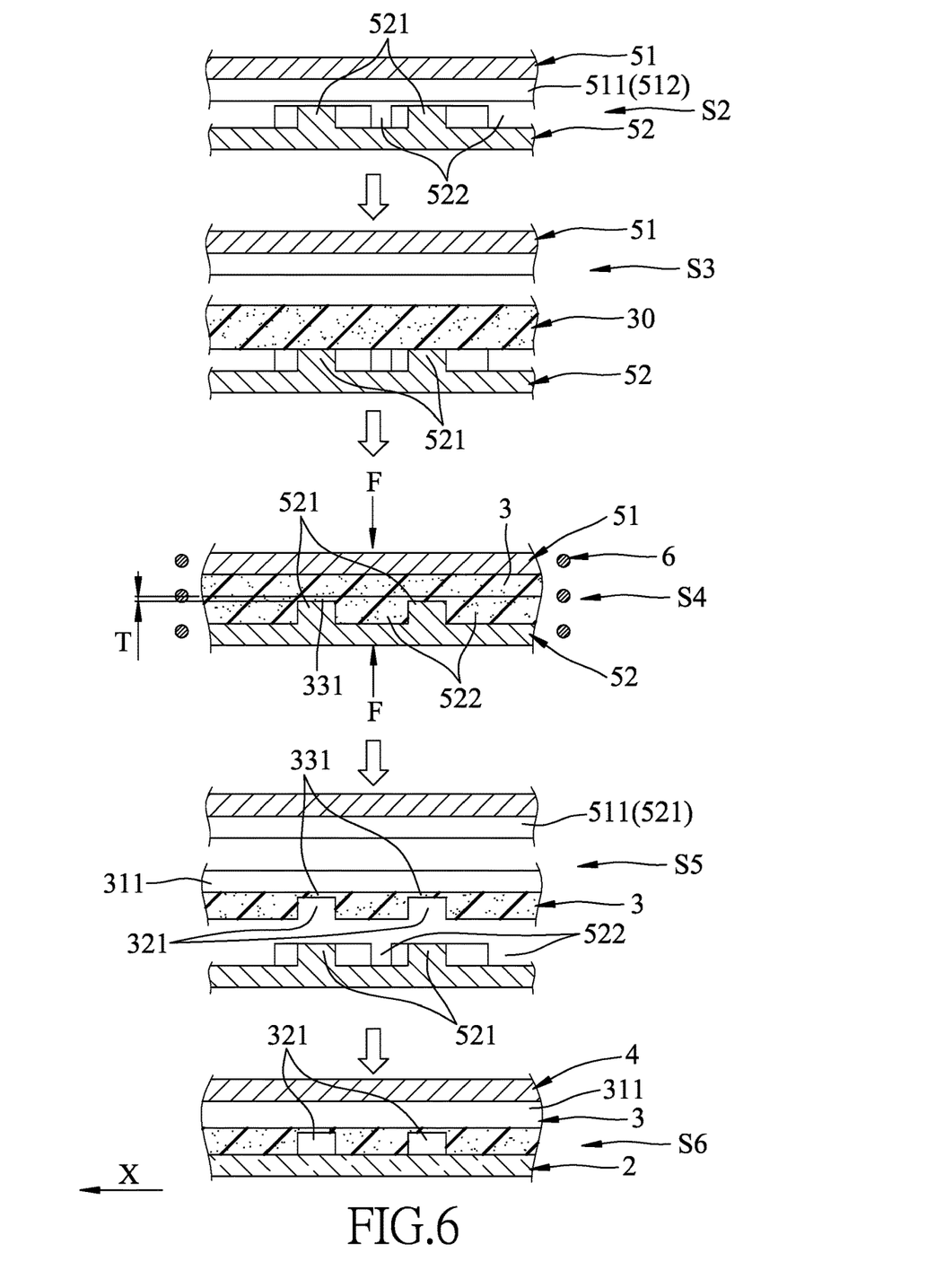
FIG. 6 shows consecutive steps of the first embodiment.
Figure 7:
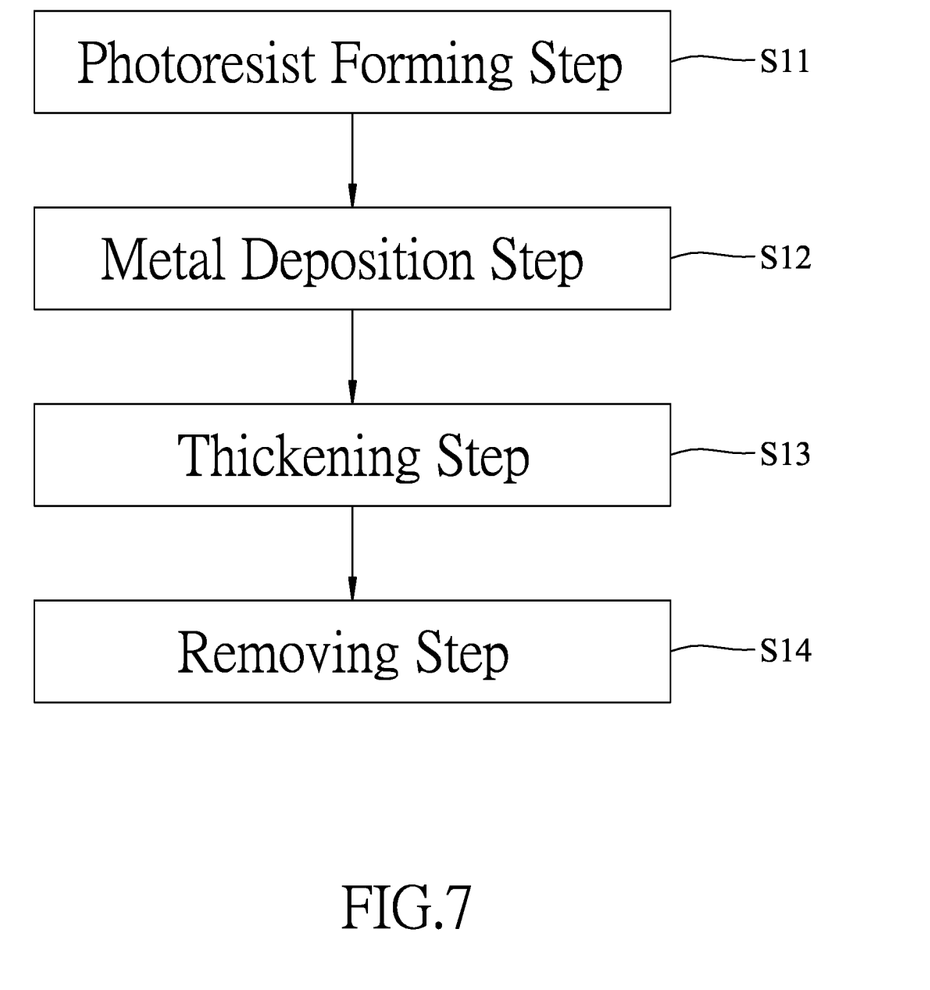
FIG. 7 is a flow chart of an electroforming step of the first embodiment.

Referring further to FIGS. 4 to 6, in the providing step (S2), a metal mold assembly 5 is provided. The metal mold assembly 5 includes an upper mold 51 and a lower mold 52. The upper mold 51 has an array of upper ribs 511 extending toward the lower mold 52, and an array of upper trenches 512, each of the which is defined by two adjacent ones of the upper ribs 511. The lower mold 52 has an array of lower ribs 521 extending toward the upper mold 51, and an array of lower trenches 522, each of which is defined by two adjacent ones of the lower ribs 521. The upper ribs 511 are spaced apart along a first direction (Y) and extend along a second direction (X) different from the first direction (Y). In this embodiment, the first direction (Y) is transverse to the second direction (X). The lower ribs 521 are spaced apart along the second direction (X), extend along the first direction (Y), and intersect the upper ribs 511 at a plurality of intersections. A lower end of the upper ribs 511 and an upper end of the lower ribs 521 cooperatively define a plurality of gaps (G) that are respectively located at the intersections. The upper trenches 512, the lower trenches 522 and the gaps (G) are spatially interconnected and cooperatively define a filling space 50.

In the disposing step (S3), a forming material 30 is placed onto the lower ribs 521 of the lower mold 52 before the upper and lower molds 51, 52 are closed. The forming material 30 may be in a form of solid or gel. In certain embodiments, the forming material 30 is made of polysiloxane, such as solid or liquid silicone resin. In certain embodiments, the forming material 30 is made of either polydimethylsiloxane or polyurethane.

In the forming step (S4), the forming material 30 is formed in the filling space 50 by hot press-molding technique to provide a channeled plate 3. The channeled plate 3 has an array of upper microfluidic channels 311 that is complementary in shape to the array of the upper ribs 511 of the upper mold 51, an array of lower microfluidic channels 321 that is complementary in shape to the array of the lower ribs 521 of the lower mold 52, and an array of thin film valves 331. The thin film valves 331 are complementary in shape to the gaps (G). In certain embodiments, in the forming step (S4), the upper and lower molds 51, 52 are preheated, and the forming material 30 is placed on the lower ribs 521 of the preheated lower mold 52, followed by closing the upper and lower molds 51, 52 to shape the forming material 30 into the channeled plate 3. In certain embodiments, in forming step (S4) (i.e., during the forming of the forming material 30 in the filling space 50), at least one of the upper and lower molds 51, 52 is moved toward the other one of the upper and lower molds 51, 52 to provide a clamping force (F) (see FIG. 6, which shows an alternative manner where the upper and lower molds 51, 52 are moved toward each other) to press the forming material 30 between the upper and lower molds 51, 52. A heater 6 schematically shown in FIG. 6 is used to heat the upper and lower molds 51, 52. In certain embodiments, the upper and lower molds 51, 52 are heated to a temperature ranging from 80° C. to 200° C. The pressed forming material 30 in the filling space 50 is cross-linked and hardened upon heating.

In the demoulding step (S5), the upper and lower molds 51, 52 are separated from the channeled plate 3.

In the packaging step (S6), the array of the lower microfluidic channels 321 and the array of the upper microfluidic channels 311 are covered. In certain embodiments, a carrier plate 2 made of glass is used for covering the lower microfluidic channels 321, and an upper cover 4 made of glass, silica gel, or plastic is used for covering the upper microfluidic channels 311. Detailed structure of the channeled plate 3 will be described hereinafter.

It should be noted that the thin film valves 331 are deformable by the pressurized gas in the upper microfluidic channels 311. Referring to FIGS. 4 to 6, each of the upper ribs 511 of the upper mold 51 has a width (W1) measured in the first direction (Y), each of the lower ribs 521 of the lower mold 52 has a width (W2) measured in the second direction (X), and each of the gaps (G) has a height (T) measured between the lower end of the upper ribs (511) and the upper end of the lower ribs (521). In certain embodiments, the upper and lower molds 51, 52 satisfy the following relationships: 2≤W1/T≤25; and 2≤W2/T≤25. In certain embodiments, the height (T) of each of the gaps (G) satisfies 10 μm≤T≤500 μm.

Referring to FIGS. 3, 5, 7, and 8, detailed description of the electroforming step (S1) is provided. An electroforming technique is used for manufacturing the metal mold assembly 5, and includes a photoresist forming step (S11), a metal deposition step (S12), a thickening step (S13), and a removing step (S14).

Figure 8:
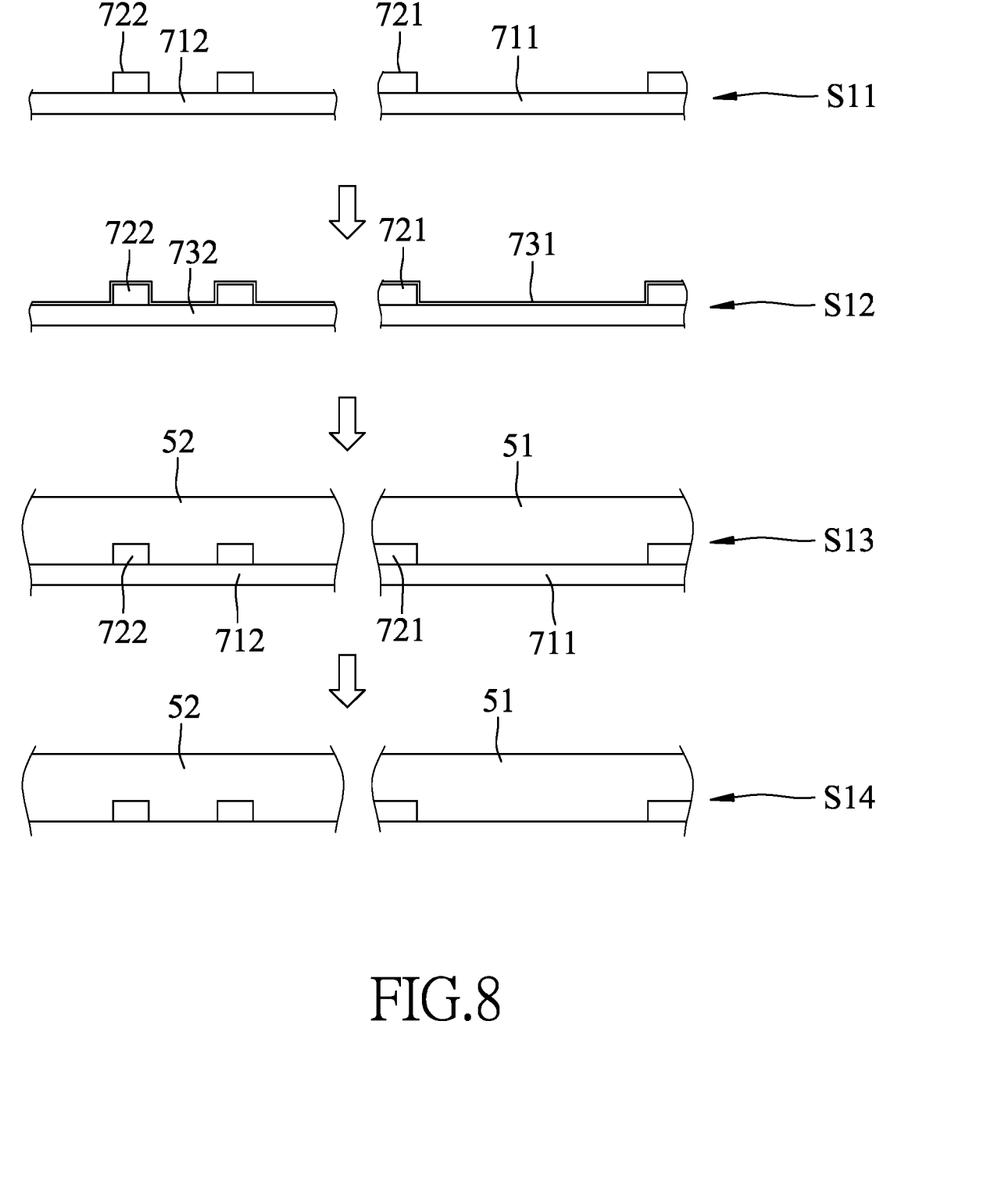
FIG. 8 shows consecutive steps of the electroforming step of the first embodiment.

The photoresist forming step (S11) is conducted by a photolithography technique, in which a first patterned photoresist layer 721 complementary in shape to the upper ribs 511 and the upper trenches 512 of the upper mold 51 is formed on a first carrier plate 711, and a second patterned photoresist layer 722 complementary in shape to the lower ribs 521 and the lower trenches 522 of the lower mold 52 is formed on a second carrier plate 712.

The metal deposition step (S12) is conducted by a sputtering technique, in which a first metal layer 731 is deposited on the first carrier plate 711 and the first photoresist layer 721, and a second metal layer 732 is deposited on the second carrier plate 712 and the second photoresist layer 722.

In the thickening step (S13), the first metal layer 731 and the second metal layer 732 are thickened by electroforming to form the upper and lower molds 51, 52.

In the removing step (S14), the first and second carrier plates 711, 712, and the first and second photoresist layers 721, 722 are removed from the upper and lower molds 51, 52.

Figure 9:
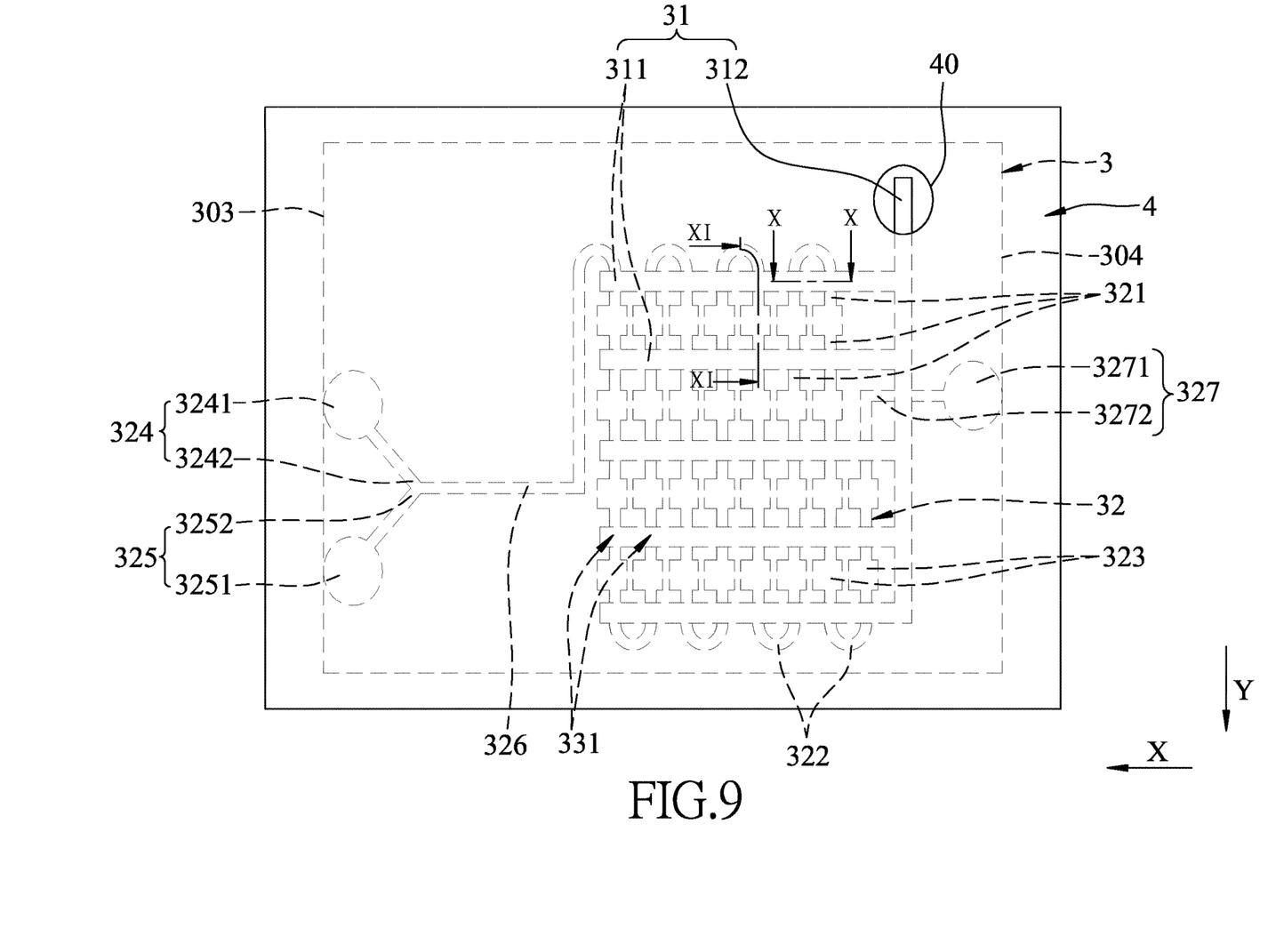
FIG. 9 is a schematic view of the microfluidic chip made by the first embodiment.
Figure 10:
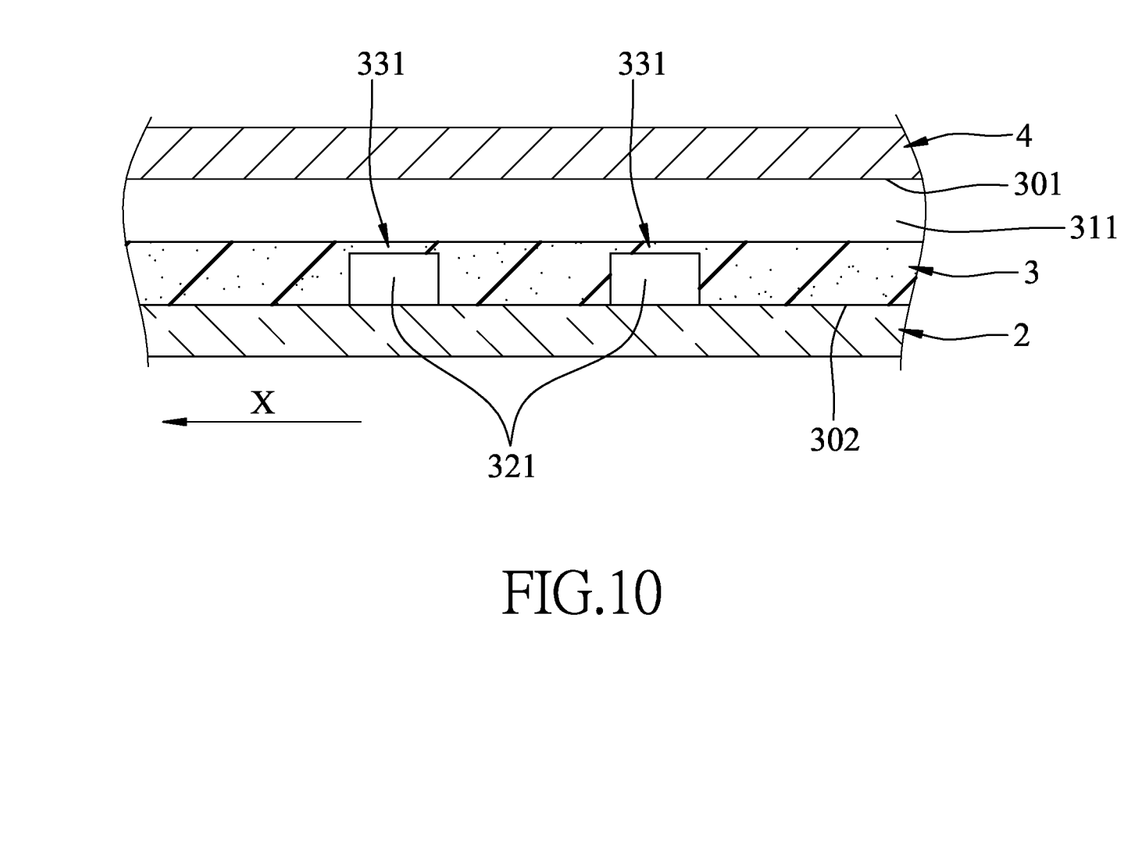
FIG. 10 is a fragmentary cross-sectional view of the microfluidic chip taken along line X-X of FIG. 9.
Figure 11:
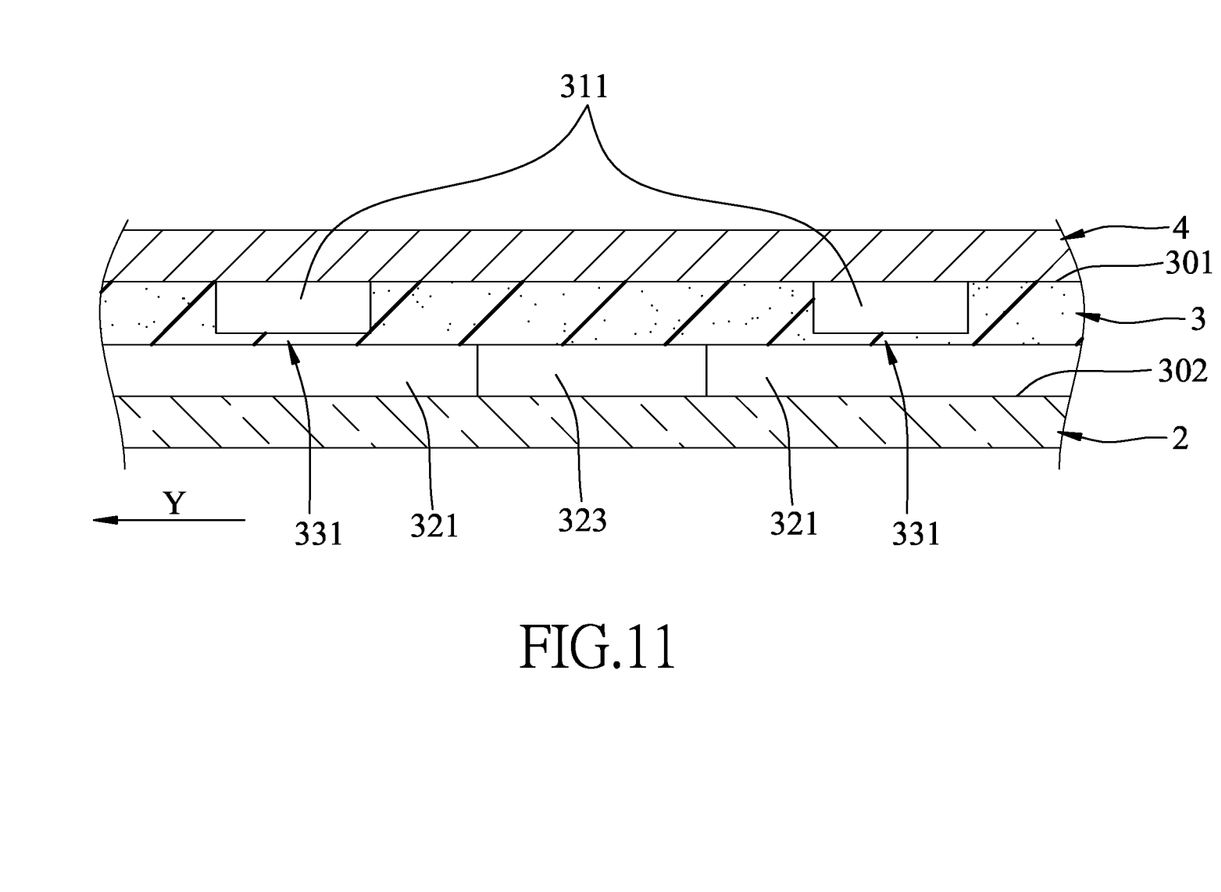
FIG. 11 is a fragmentary cross-sectional view of the microfluidic chip taken along line XI-XI of FIG. 9.

Referring to FIGS. 9 to 11, the microfluidic chip manufactured by the first embodiment of the method according to the present disclosure includes the carrier plate 2, the channeled plate 3, and the upper cover 4.

The channeled plate 3 has an upper surface 301, a lower surface 302 opposite to the upper surface 301, a gaseous fluid channel unit 31, a liquid fluid channel unit 32, and the array of the thin film valves 331.

The gaseous fluid channel unit 31 has the array of the upper microfluidic channels 311 and a confluence channel 312. The upper microfluidic channels 311 are indented from the upper surface 301, are intercommunicated by the confluence channel 312 indented from the upper surface 301, are spaced apart along the first direction (Y), and extend along the second direction (X) transverse to the first direction (Y).

The liquid fluid channel unit 32 has the array of the lower microfluidic channels 321, a plurality of bending channels 322, an array of reaction slots 323, a first entrance channel 324, a second entrance channel 325, a mixing channel 326, and an exiting channel 327 that are indented from the lower surface 302 and are discommunicated from the upper microfluidic channels 311. The lower microfluidic channels 321 are spaced apart along the second direction (X), extend along the first direction (Y), and are intercommunicated by the bending channels 322 that are arranged in two rows along the second direction (X) to intercommunicate adjacent two of the lower microfluidic channels 321 (see FIG. 9). The array of reaction slots 323 is arranged to be in spatial communication with the lower microfluidic channels 321 (see FIG. 9). The lower microfluidic channels 321 intersect the upper microfluidic channels 311 at a plurality of intersections.

Each of the first and second entrance channels 324, 325 has a starting section 3241, 3251 that is formed in a side surface 303 of the channeled plate 3 that interconnects the upper surface 301 and the lower surface 302, and an ending section 3242, 3252 spatially communicated to the starting section 3241, 3251. The mixing channel 326 is spatially intercommunicated between the ending sections 3242, 3252 of the first and second entrance channels 324, 325 and an end of one of the lower microfluidic channels 321. The exiting channel 327 has a first exiting section 3271 that is formed in a side surface 304 of the channeled plate 3 opposite to the side surface 303, and a second exiting section 3272 that is spatially intercommunicated the first exiting section 3271 and an end of another one of the lower microfluidic channels 321.

In certain embodiments, a test sample of deoxyribonucleic acid may be introduced into the microfluidic chip through the starting section 3241 of the first entrance channel 324, and a reagent may be introduced into the microfluidic chip through the starting section 3251 of the second entrance channel 325. The test sample and the reagent may be mixed in the mixing channel 326 to undergo a polymerase chain reaction.

The array of the thin film valves 331 is formed at the intersections where the upper microfluidic channels 311 intersect the lower microfluidic channels 321.

The upper cover 4 is attached to the upper surface 301 of the channeled plate 3, seals the upper microfluidic channels 311, and has an opening 40 that is in spatial communication with the confluence channel 312 of the gaseous fluid channel unit 31.

Figure 12:
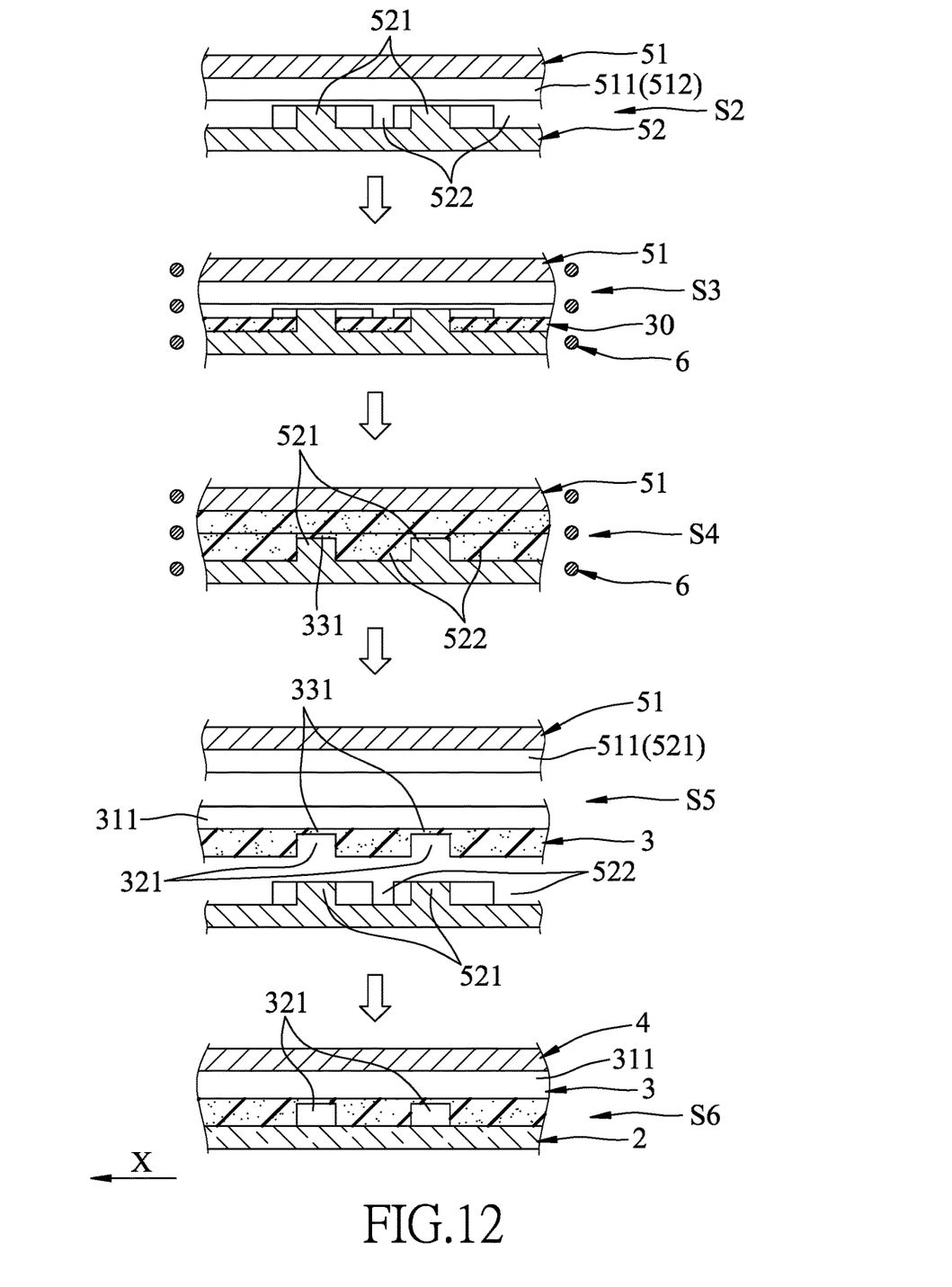
FIG. 12 shows consecutive steps of a second embodiment of the method of manufacturing the microfluidic chip according to the present disclosure.

Referring to FIGS. 3 and 12, a second embodiment of the method of manufacturing the microfluidic chip according to the present disclosure has process steps similar to those of the first embodiment, with differences described below.

In the disposing step (S3), the forming material 30 is in a gel form, is evenly mixed in a feeding system (not shown), and is injected into the filling space 50 through an injection port (not shown) of the metal mold assembly 5.

In the forming step (S4), the upper and lower molds 51, 52 are heated, and the forming material 30 is hardened to form the channeled plate 3.

In certain embodiments, the upper and lower molds 51, 52 are closed and heated by the heater 6 to a pre-determined temperature, followed by injecting the forming material 30 into the filling space 50 through the injection port to allow the forming material 30 to be hardened to form the channeled plate 3.

In certain embodiments, the forming material 30 is made of liquid silicone rubber and is formed into the channeled plate 3 by injection molding technique. In certain embodiments, the forming material 30 may be made of a thermoplastic material, such as styrenic thermoplastic elastomer, and may be hardened by cooling instead of heating.

To sum up, in this disclosure, the array of the upper ribs 511 of the upper mold 51, the array of the lower ribs 521 of the lower mold 52, and the gaps (G) formed between the upper and lower molds 51, 52 to ensure that the upper microfluidic channels 311, the lower microfluidic channels 321, and the thin film valves 331 of the channeled plate 3 are precisely arranged with respect to each other according to desired lay out, thereby ensuring normal function of the microfluidic chip made by the method of this disclosure.

In the description above, for the purposes of explanation, numerous specific details have been set forth in order to provide a thorough understanding of the embodiments. It will be apparent, however, to one skilled in the art, that one or more other embodiments may be practiced without some of these specific details It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of manufacturing a microfluidic chip comprising:
    providing a metal mold assembly which includes an upper mold and a lower mold, the upper mold having an array of upper ribs extending toward the lower mold and an array of upper trenches, each of the upper trenches being defined by two adjacent ones of the upper ribs, the lower mold having an array of lower ribs extending toward the upper mold and an array of lower trenches, each of the lower trenches being defined by two adjacent ones of the lower ribs, the upper ribs being spaced apart along a first direction and extending along a second direction different from the first direction, the lower ribs being spaced apart along the second direction, extending along the first direction and intersecting the upper ribs at a plurality of intersections, a lower end of the upper ribs and an upper end of the lower ribs cooperatively defining a plurality of gaps that are respectively located at the intersections, the upper trenches, the lower trenches and the gaps being spatially interconnected and cooperatively defining a filling space;
    forming a forming material in the filling space to provide a channeled plate having an array of upper microfluidic channels that is complementary in shape to the array of the upper ribs of the upper mold, an array of lower microfluidic channels that is complementary in shape to the array of the lower ribs of the lower mold, and an array of thin film valves, the thin film valves being complementary in shape to the gaps;
    separating the upper and lower molds from the channeled plate; and
    covering the array of the lower microfluidic channels and the array of the upper microfluidic channels.

2. The method as claimed in claim 1, wherein each of the upper ribs of the upper mold has a width measured in the first direction, each of the lower ribs of the lower mold having a width measured in the second direction, each of the gaps having a height measured between the lower end of the upper ribs and the upper end of the lower ribs, the upper and lower molds satisfying the following relationships:

$$2 \leq W1/T \leq 25; \text{ and}$$

$$2 \leq W2/T \leq 25.$$

3. The method as claimed in claim 1, wherein providing the metal mold assembly includes:
    forming on a first carrier plate a first patterned photoresist layer that is complementary in shape to the upper ribs and the upper trenches of the upper mold, and forming on a second carrier plate a second patterned photoresist layer that is complementary in shape to the lower ribs and the lower trenches of the lower mold;
    depositing a first metal layer on the first photoresist layer, and a second metal layer on the second photoresist layer;
    thickening the first metal layer and the second metal layer by electroforming to form the upper and lower molds; and
    removing the first and second carrier plates and the first and second photoresist layers from the upper and lower molds.

4. The method as claimed in claim 1, wherein forming the forming material in the filling space includes preheating the upper and lower molds, and placing the forming material on the lower ribs of the lower mold which is preheated, followed by closing the upper and lower molds to shape the forming material into the channeled plate.

5. The method as claimed in claim 1, wherein, during the forming of the forming material in the filling space, at least one of the upper and lower molds is moved toward the other one of the upper and lower molds to provide a clamping force to press the forming material between the upper and lower molds.

6. The method as claimed in claim 1, wherein forming the forming material in the filling space includes:
    heating the metal mold assembly; and
    injecting the forming material into the filling space to form the channeled plate.

7. The method as claimed in claim 1, wherein the first direction is transverse to the second direction.

8. A method of manufacturing a microfluidic chip comprising:
    providing a lower mold that includes at least one lower rib extending in a first direction;
    providing an upper mold that includes at least two adjacent and spaced apart upper ribs extending in a second direction different from the first direction;
    closing the upper and lower molds, the upper ribs intersecting the lower rib at at least one intersection, a gap being formed at the intersection;
    forming a channeled plate between the upper and lower molds after the upper and lower molds are closed, the channeled plate having at least one upper microfluidic channel that is complementary in shape to the upper ribs, at least one lower microfluidic channel that is complementary in shape to the lower rib, and at least one thin film valve that is complementary in shape to the gap;
separating the upper and lower molds; and
covering the upper and lower microfluidic channels.

9. The method as claimed in claim 8, wherein the first direction is transverse to the second direction.

10. The method as claimed in claim 8, wherein each of the upper ribs of the upper mold has a width measured in the first direction, the lower rib of the lower mold having a width measured in the second direction, the gap having a height measured between a lower end of the upper ribs and an upper end of the lower rib, the upper and lower molds satisfying the following relationships:

$2 \le W1/T \le 25$; and $2 \le W2/T \le 25$.

11. The method as claimed in claim 8, wherein:
providing the upper mold includes
    forming on a first carrier plate a first patterned photoresist layer that is complementary in shape to the upper ribs,
    depositing a first metal layer on the first photoresist layer,
    thickening the first metal layer by electroforming to form the upper mold, and
    removing the first carrier plate and the first photoresist layer from the upper mold; and
providing the lower mold includes
    forming on a second carrier plate a second patterned photoresist layer that is complementary in shape to the lower rib,
    depositing a second metal layer on the second photoresist layer,
    thickening the second metal layer by electroforming to form the lower mold, and
    removing the second carrier plate and the second photoresist layer from the lower mold.

12. The method as claimed in claim 8, wherein forming the channeled plate includes preheating the upper and lower molds, and placing a forming material on the lower rib of the lower mold which is preheated, followed by closing the upper and lower molds to shape the forming material into the channeled plate.

13. The method as claimed in claim 8, wherein, during the forming of the channeled plate, at least one of the upper and lower molds is moved toward the other one of the upper and lower molds to provide a clamping force to press a forming material between the upper and lower molds.

14. The method as claimed in claim 8, wherein forming the channeled plate includes:
heating the upper and lower molds; and
injecting a forming material into a filling space between the upper and lower molds to form the channeled plate.

* * * * *